United States Patent
Verma et al.

(10) Patent No.: US 11,673,722 B2
(45) Date of Patent: Jun. 13, 2023

(54) METHOD AND SYSTEM FOR SECURE COURIER TRANSPORT AND DATA STORAGE VIA BLOCKCHAIN

(71) Applicant: MASTERCARD INTERNATIONAL INCORPORATED, Purchase, NY (US)

(72) Inventors: Rachit Verma, New Delhi (IN); Nishant Maheshwari, Uttar Pradesh (IN); Gayatri Dwivedi, Gurugram (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 801 days.

(21) Appl. No.: 15/959,429

(22) Filed: Apr. 23, 2018

(65) Prior Publication Data
US 2019/0322426 A1    Oct. 24, 2019

(51) Int. Cl.
*H04L 9/06*    (2006.01)
*G06K 19/06*   (2006.01)
*B65D 55/02*   (2006.01)

(52) U.S. Cl.
CPC ..... *B65D 55/026* (2013.01); *G06K 19/06037* (2013.01); *G06K 19/06093* (2013.01); *H04L 9/0637* (2013.01)

(58) Field of Classification Search
CPC .......... B65D 55/026; G06K 19/06037; G06K 19/06093; H04L 9/0637
(Continued)

(56) References Cited

U.S. PATENT DOCUMENTS

2016/0164884 A1* 6/2016 Sriram ............ G06Q 10/06315
                                                          705/51
2017/0032381 A1* 2/2017 Vaidyanathan .... G06Q 30/0185
(Continued)

FOREIGN PATENT DOCUMENTS

WO    WO-2012025414 A1 *  3/2012   ............... G06K 9/18

OTHER PUBLICATIONS

S. Ngamsuriyaroj, T. Likittheerameth, A. Kahutson and T. Pathummasut, "Package Delivery System Based on Blockchain Infrastructure," 2018 Seventh ICT International Student Project Conference (ICT-ISPC). Retrieved from https://ieeexplore.ieee.org/abstract/document/8523944. (Year: 2018).*

*Primary Examiner* — Shannon S Campbell
*Assistant Examiner* — Lisa Ma
(74) *Attorney, Agent, or Firm* — Panitch Schwarze Belisario & Nadel LLP

(57) ABSTRACT

A method for preventing tampering with a package includes: affixing a plurality of labels to a physical package, each label including a machine-readable code, the machine-readable code being encoded with a unique value that is unique across the machine-readable code included in each of the plurality of labels; reading, by a computing device, the machine-readable code included in each label of the plurality of affixed labels to obtain the encoded unique value; storing, in the computing device, a cryptographic key pair comprised of a public key and a private key; generating, by the computing device, a digital signature using the private key; and electronically transmitting, by the computing device, a data message to a node in a blockchain network, wherein the data message includes at least the generated digital signature, the public key, and the unique value read for each label of the plurality of labels.

10 Claims, 6 Drawing Sheets

(58) Field of Classification Search
USPC .......................................................... 705/332
See application file for complete search history.

(56) References Cited

U.S. PATENT DOCUMENTS

| | | | |
|---|---|---|---|
| 2017/0262862 A1* | 9/2017 | Aljawhari | G06F 16/242 |
| 2018/0096175 A1* | 4/2018 | Schmeling | G06F 1/3206 |
| 2018/0108024 A1* | 4/2018 | Greco | H04W 4/029 |
| 2018/0336515 A1* | 11/2018 | Mehring | H04L 9/0637 |
| 2019/0147397 A1* | 5/2019 | Hodges | G06Q 10/08 |
| | | | 705/333 |
| 2020/0394372 A1* | 12/2020 | Fontaine | G06K 7/1417 |

* cited by examiner

METHOD AND SYSTEM FOR SECURE COURIER TRANSPORT AND DATA STORAGE VIA BLOCKCHAIN

FIELD

The present disclosure relates to the secure transportation of packaging facilitated by a blockchain, specifically the prevention of tampering with a package and determinations of authenticity related thereto via the use of machine-readable codes affixed to the package and the storage of data associated therewith in a blockchain.

BACKGROUND

Millions and millions of packages get delivered on a daily basis. The vast majority of these packages are delivered from manufacturer to merchant to consumer by one or more courier services and arrives successfully and without incident. However, occasionally packages are lost, stolen, replaced, destroyed, or otherwise fail to reach their destination for one reason or another. These occurrences often occur to the detriment of all of the parties involved: the merchant may lose a sale and future business, the consumer may lose the product or the amount they paid for, the courier may be liable for damages, etc. Thus, it is often in the interest of everyone involved in the transportation of packages to ensure that packages are delivered successfully, that they have not been tampered with, and that they are the correct package.

Various methods have been implemented by courier services designed to make the process more secure and reliable. Often times, a package is assigned a unique value, commonly referred to as a tracking number, where any interested party can view the current location and/or status of the package via the number. However, this is typically tracked through a small label on the package that could be easily replaced or switched, and also fails to provide any authentication regarding the contents of the package itself. Some courier services or even the manufacturer or merchant themselves may use tamper-proof packaging, which may uncover any attempt at exchanging the contents of the package. However, this does not prevent theft or switching of the package itself, and in some cases a nefarious actor could tamper with the package and then use new tamper-proof packaging to replicate the original package unbeknownst to all parties involved. Other attempted solutions similarly address one problem in the secure courier of packages, resulting in parties having to implement a series of workarounds to try and ensure that a package is not replaced, damaged, lost, tampered with, or stolen during its journey from manufacturer or merchant to the consumer.

Thus, there is a need for an improved technological solution to increase the security related to package transportation and the authentication thereof, which minimizes the time and effort that must be expended by each party involved in the transport of the package while maintaining a high level of security.

SUMMARY

The present disclosure provides a description of systems and methods for preventing tampering with packages and determining the authenticity thereof through the use of machine-readable codes and a blockchain. A series of machine-readable codes, such as quick response (QR) codes, are affixed to or printed on a package particularly at vulnerable points of the package (e.g., where two parts/flaps come together, where the package would normally be opened or at typical crush points), where each QR code is encoded with a unique value. Each of the values for all of the QR codes affixed to the package are stored in a blockchain. As the package goes on its journey from start to finish, each of the QR codes are scanned to verify that the package is the original package and has not been tampered with, where the blockchain may be further updated to reflect the successful verification. As described below, blockchains provide immutable, secure and verified data and if public, can be seen by anyone possessing the code, meaning that any of the interested parties (e.g., customer, merchant, shippers, truck drivers, customs agents, and anyone else involved or concerned with the safe transport of the package) can have quick access to trustworthy information regarding same. When the package finishes its journey, the consumer may also scan the QR codes and verify the package, where the unique values may ensure that the package has not been replaced and where the series of QR codes may make replacement or tampering with the labels themselves difficult or impossible. When the labels are affixed to vulnerable points on the package or at enough points that the product inside cannot be extracted without affecting at least one label, for example, the protection against tampering can be increased even more. Further, QR codes can be made part of other images, thereby obscuring their presence. The result is that every party in the courier process can be assured that the contents of the package have not been modified, that the package has not been tampered with or replaced, and that it has reached its target successfully. If at an intermediate station where the labels are check, it is determined that the package is not authentic or has been damaged, it can be intercepted and appropriate action taken (e.g., manual inspection, reviewing a more limited set and time frames of security cameras, determining what occurred in that isolated segment of the transport, perhaps shipping a replacement and returning the potentially damaged goods more promptly than possible in conventional systems, etc.) without requiring involvement by the customer or requiring the package be sent back from its final destination, thereby saving time and resources. This technology can also assist in detecting false claims of damage or other issues than conventional technology permits, thereby reducing resources needed to conducting a conventional investigation. The use of the labels and a blockchain for storing the related data means this security can be afforded simply and easily without the need for multiple solutions and in a manner that can be implemented quickly and is managed by a decentralized system via the blockchain, thus providing even greater security for all parties involved.

A method for preventing tampering with a package includes: affixing a plurality of labels to a physical package, wherein each label includes a machine-readable code, the machine-readable code being encoded with a unique value that is unique across the machine-readable code included in each of the plurality of labels; reading, by a computing device, the machine-readable code included in each label of the plurality of labels affixed to the physical package to obtain the encoded unique value; storing, in the computing device, a cryptographic key pair comprised of a public key and a private key; generating, by the computing device, a digital signature using the private key; and electronically transmitting, by the computing device, a data message to a node in a blockchain network, wherein the data message includes at least the generated digital signature, the public key, and the unique value read for each label of the plurality of labels.

A method for determining authenticity of a package includes: storing, in a memory of a computing device, blockchain data associated with a blockchain, wherein the blockchain data includes a plurality of blocks, each block including at least a block header including a timestamp and one or more package data values, each package data value including at least a digital signature, public key, and a plurality of unique values; receiving, by a receiver of the computing device, a set of unique values; executing, by the computing device, a query on the memory to identify, in the blockchain data, a set of package data values where the plurality of unique values included in each package data value in the set includes at least one of the unique values of the set of unique values; determining, by the computing device, authenticity of a package associated with the set of unique values, where the package is determined to be authentic if the plurality of unique values included in every package data value of the set of package data values matches the set of unique values, and the package is determined to be inauthentic if the plurality of unique values included in at least one package data value of the set of package data values does not match the set of unique values; and electronically transmitting, by a transmitter of the computing device, the determined authenticity of the package.

A system for preventing tampering with a package includes: a physical package, wherein a plurality of labels are affixed thereto, each label includes a machine-readable code, the machine-readable code being encoded with a unique value that is unique across the machine-readable code included in each of the plurality of labels; and a computing device configured to read the machine-readable code included in each label of the plurality of labels affixed to the physical package to obtain the encoded unique value, store a cryptographic key pair comprised of a public key and a private key, generate a digital signature using the private key, and electronically transmit a data message to a node in a blockchain network, wherein the data message includes at least the generated digital signature, the public key, and the unique value read for each label of the plurality of labels.

A system for determining authenticity of a package includes: a memory of a computing device configured to store blockchain data associated with a blockchain, wherein the blockchain data includes a plurality of blocks, each block including at least a block header including a timestamp and one or more package data values, each package data value including at least a digital signature, public key, and a plurality of unique values; a receiver of the computing device configured to receive a set of unique values; and a transmitter of the computing device, wherein the computing device is configured to execute a query on the memory to identify, in the blockchain data, a set of package data values where the plurality of unique values included in each package data value in the set includes at least one of the unique values of the set of unique values, and determine authenticity of a package associated with the set of unique values, where the package is determined to be authentic (e.g., the contents are as expected and undamaged) if the plurality of unique values included in every package data value of the set of package data values matches the set of unique values, and the package is determined to be inauthentic if the plurality of unique values included in at least one package data value of the set of package data values does not match the set of unique values, and the transmitter of the computing device is configured to electronically transmit the determined authenticity of the package.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for Secure Courier Transport and Data Storage

Figure 1:
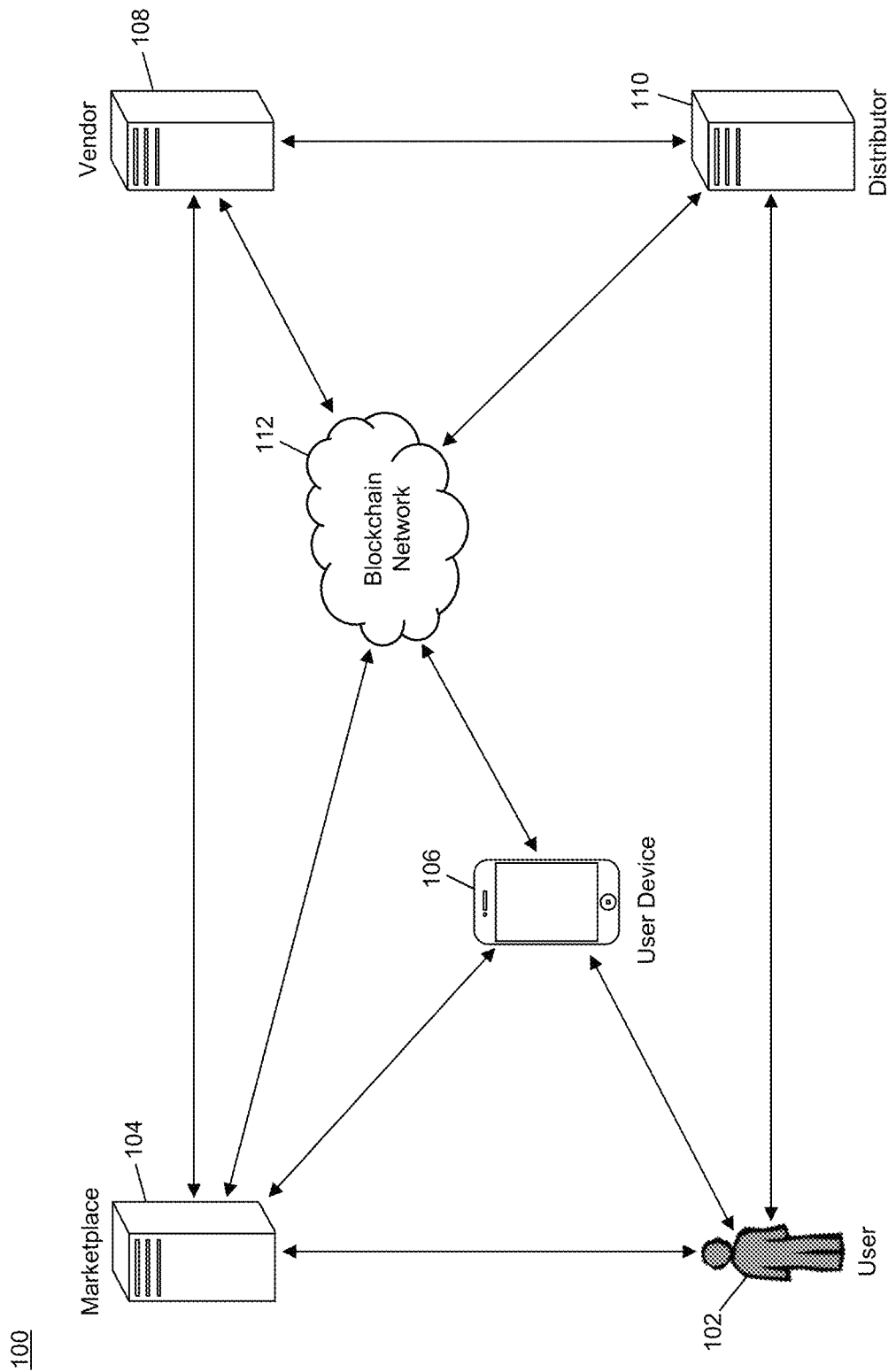
FIG. 1 is a block diagram illustrating a high level system architecture for the secure transportation of packages in accordance with exemplary embodiments.

FIG. 1 illustrates a system 100 for the secure transportation of a package that is couriered from one location to another that is secured via the use of labels with machine-readable codes affixed thereto with data storage being performed using a blockchain.

In the system 100, a user 102 may purchase a product from a marketplace 104. The marketplace 104 may be a physical (e.g., a brick and mortar location) or virtual (e.g., website, application program, etc.) marketplace that offers products for purchase to users that may be delivered to the user via secure courier transport. For virtual or other types of remote marketplaces, the user 102 may interact with the marketplace 104 using a user device 106. The user device 106 may be any suitable type of computing device, such as a desktop computer, laptop computer, notebook computer, tablet computer, cellular phone, smart phone, smart watch, smart television, wearable computing device, implantable computing device, etc. The user 102 may, for instance, use the user device 106 to access a website for the marketplace 104 where the user 102 may select a product for purchase on their user device 106 via the website. As part of the purchase, the user 102 may provide the marketplace 104 with a delivery address where the corresponding package is to be transported in accordance with the purchase.

Once the user 102 has purchased the product, the marketplace 104 may inform a vendor 108 that manufacturers or otherwise has the product available. In some embodiments, the marketplace 104 may be the vendor 108. The marketplace 104 may provide the vendor 108 with the product that was purchase and may also provide the vendor 108 with the delivery address submitted by the user 102. The vendor 108 may then prepare a package to ship the product to the user 102 at the user's provided delivery address.

As part of the preparation of the package, the vendor 108 may affix a plurality of labels thereto. In some cases, one or more of the labels may be affixed to vulnerable points on the package, such as to provide further security against tampering. Each of the labels may have a machine-readable code printed thereon. The machine-readable code may be encoded with a unique value. The machine-readable code may be any type of code that is capable of encoded data therein and that is readable by an external device to decode the code encoded therein, such as a bar code, quick response (QR) code, etc. The unique value may be any type of value suitable for use in performing the functions discussed herein, such as an alphanumeric value or a number. The value encoded in each of the machine-readable codes may be unique across at least the machine-readable codes affixed to the package. In some cases, the values may be unique across all machine-readable codes used in the system 100, such as across every package that may be transported using the methods discussed herein. In some instances, the unique values may be such that the combination of unique values for the package is unique across all packages, even where some values may be repeated on other packages. In some cases, each unique value may be randomly or pseudo-randomly generated or identified. In other cases, the unique values may be selected by one of the parties in the system 100. For instance, the user 102 may specify, when providing shipping information, the unique values that are to be encoded in each of the machine-readable codes. In cases where the user 102 does not specify the unique values, the marketplace 104 and/or vendor 108 may provide the unique values to the user 102 (e.g., via the user device 106) for use by the user 102 in ensuring authenticity of the package upon delivery.

Once the package has been prepared and the labels affixed thereto, the vendor 108 may provide the package to a distributor 110. The distributor 110 may then courier the package from the vendor 108 to the user 102 using any suitable delivery method. The distributor 110 may deliver the package to the user 102. Throughout the transportation of the package, the location or other status information regarding the package may be updated and recorded via a blockchain. The system 100 may include a blockchain network 112. The blockchain network 112 may be comprised of a plurality of nodes, where each node is configured to verify proposed blockchain data values, generate new blocks for the blockchain, validate new blocks, and maintain a copy of the blockchain. The blockchain itself may be comprised of a plurality of blocks, where each block includes at least a block header and one or more blockchain data values, also referred to herein as package data values.

A block header may include at least a timestamp, a block reference value, and a data reference value. The timestamp may be a time at which the block header is generated, or may refer to a time by which each of the blockchain data values in the respective block may be submitted. The block reference value may be a reference to an earlier block in the blockchain, such as a reference to the block header of the most recent block (e.g., based on timestamp) added to the blockchain prior to the respective block. In some embodiments, the block reference value may be a hash value generated via hashing of the block header of the preceding block. The data reference value may be a reference to the blockchain data values included in the respective block. In some embodiments, the data reference value may be the root of a Merkle tree that is generated using the blockchain data values. The use of the reference values may ensure immutability of the blockchain, as any modification to a blockchain data value or block header necessitates changing of the corresponding data reference value and the block reference value included in every subsequent block in the blockchain, which must be performed in a majority of nodes in the blockchain network 112, and prior to any new blocks being added, which may be computationally and communicatively impossible.

The blockchain data values may each correspond to a package and the delivery thereof. Each blockchain data value may include at least the unique values encoded in each of the machine-readable codes that are affixed to the package. In some cases, each package may also have a value associated therewith, referred to herein as a package identifier, that is unique to the package itself and may be independent and/or unrelated to the unique values. In such cases, each blockchain data value may include the package identifier for the package to which it relates. In some instances, each machine-readable code affixed to a package may be further encoded with that package's package identifier. In other instances, the package identifier may be encoded in a different machine-readable code affixed to the package or otherwise displayed on the package. In some cases, each blockchain data value may include additional status information regarding the package.

For example, when the vendor 108 prepares the package, the vendor 108 may provide a node in the blockchain network 112 with the unique values encoded in each of the machine-readable codes affixed thereto, as well as the package identifier, and an update that the product has been packaged and is being handed off to the distributor 110. In some cases, the time and/or date may be included. In other cases, the timestamp included in the block header of the block that includes a blockchain data value for the update may be attributed to the update. The node in the blockchain network 112 may receive the data from the vendor 108 and may generate a new blockchain data value that is included in a newly generated block that is validated by other nodes in the blockchain network 112 and added to the blockchain. The distributor 110 may similarly submit status updates to the blockchain network 112 during the transportation of the package, such as by submitting updates each time the package reaches a new location, is handed off from one facility to another, enters a different stage in the delivery process, etc.

In some embodiments, photographs may also be used to provide additional security regarding the machine-readable codes. For instance, the vendor 108 and/or distributor 110 may photograph each of the machine-readable codes and provide the photographs to the blockchain network 112 for inclusion in the blockchain data values added to the blockchain for the package. The photographs may provide for an additional layer of security to ensure that the machine-readable codes themselves are not tampered with or removed (e.g., to help prevent switching of all of the labels affixed to the package from one package to another).

In the system 100, the user 102 may be able to verify the authenticity and status of the package throughout the entire delivery process. The user 102 may, using the user device 106, view the status of the package via the blockchain. The user device 106 may be configured to interact with a node in the blockchain network 112 or a third party system in communication therewith, to access the blockchain data values stored in the blockchain. The user device 106, or other system, as applicable, may be configured to identify each blockchain data value that includes the package identifier for the package (e.g., as provided to the user 102 following the purchasing process). The blockchain data values may then be evaluated to determine if the unique values included therein match the unique values encoded in the machine-readable codes affixed by the vendor 108 at the time of initial packaging of the product. If the unique values remain the same throughout the delivery process, the package may be determined to be authentic. If, at any point, one of the unique values changes, is missing, or otherwise shows evidence of tampering or replacement, the package may be determined to be inauthentic. In such a case, the timestamp and/or status update of the blockchain data value that has different unique values may be of assistance in determining what happened to the package. For instance, if the package was handed to a new employee of the distributor 110 and the blockchain data value updated to show a change in unique values, then the distributor 110 may investigate the employee or the handing off of the package.

The use of the unique values may thus provide the user 102 with the opportunity to determine if a package that has been delivered is authentic and to provide additional information to the user 102, vendor 108, and distributor 110 if and when a package has been stolen, damaged, replaced, etc. The immutability of the blockchain and timestamp of blocks may provide for an accurate, secure, and infallible record of the movement of the package from vendor 108 to distributor 110 to user 102 to provide greater security and peace of mind to all involved entities.

In some embodiments, cryptographic key pairs may be used in the updating of the blockchain to provide for greater security and verification of the movement of the package. In such embodiments, the blockchain network 112 may utilize cryptographic key pairs in the updating of the blockchain similar to traditional blockchain transactions, where each new blockchain data entry submitted thereto may be accompanied by a digital signature generated via a private key of a cryptographic key pair. The digital signature may be such that it may be verified by a public key of the same cryptographic key pair. In such cases, the vendor 108 and distributor 110 (e.g., and any other entity updating the status of the package) may each have a private key and may generate a digital signature for all updates submitted to the blockchain network 112. The nodes in the blockchain network 112 may have the corresponding public keys (e.g., which may be provided in the submissions) and may validate the digital signatures before updating the blockchain. The public keys may be similarly used by the user device 106 or other system when determining the authenticity of the package, such as by validating the digital signature in each blockchain data value when checking the unique values included therein. In some cases, the public keys may be encoded in one or more of the machine-readable codes or otherwise provided with the package and/or in shipping information provided to the user 102 (e.g., provided with the unique values to the user device 106). In some embodiments, the vendor 108 and distributor 110 may share a private key for a single cryptographic key pair.

Computing System

Figure 2:
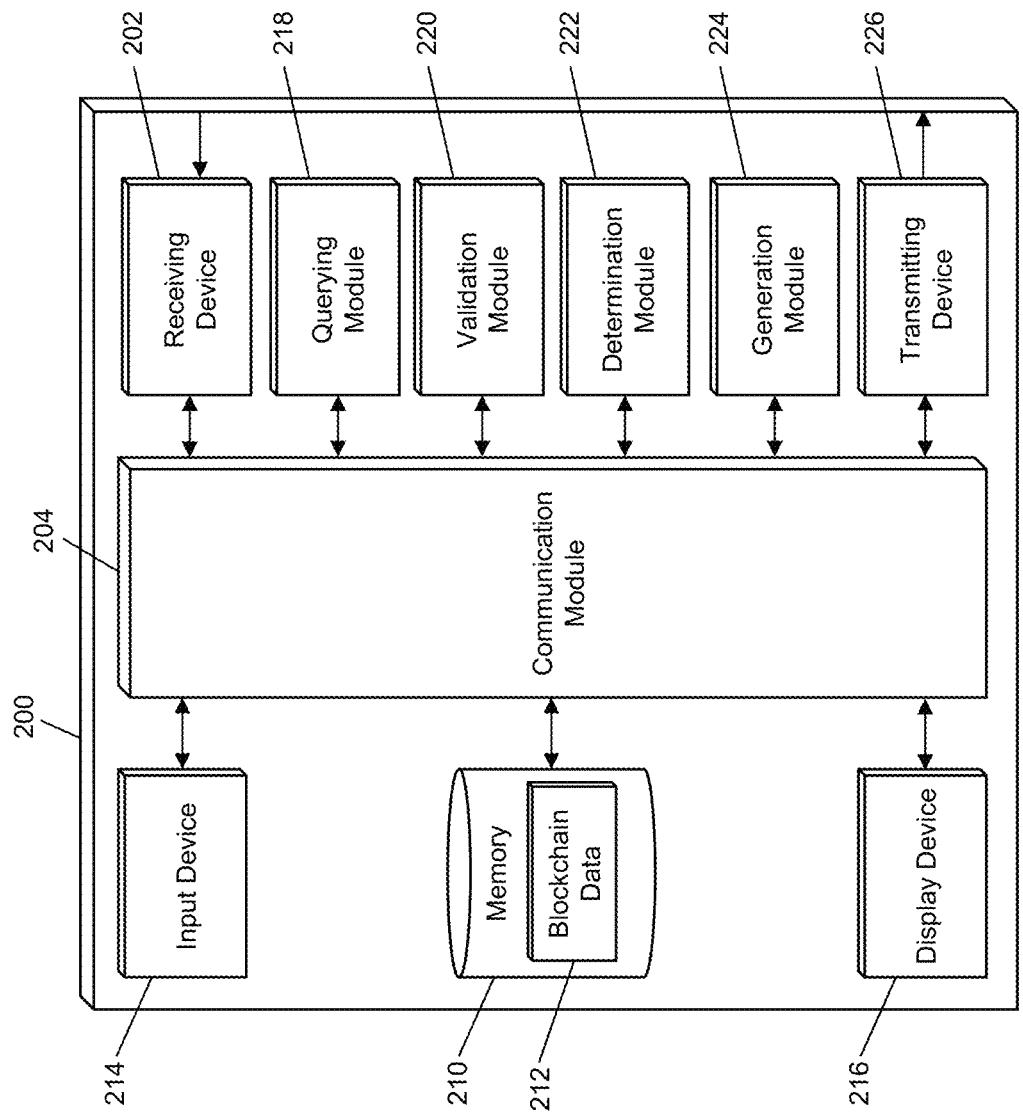
FIG. 2 is a block diagram illustrating a computing device for use in the system of FIG. 1 for preventing tampering with a package and authenticating a package in accordance with exemplary embodiments.

FIG. 2 illustrates an embodiment of a computing system 200 in the system 100, such as may serve as or as a part of the marketplace 104, user device 105, vendor 108, or distributor 110. It will be apparent to persons having skill in the relevant art that the embodiment of the computing system 200 illustrated in FIG. 2 is provided as illustration only and may not be exhaustive to all possible configurations of the computing system 200 suitable for performing the functions as discussed herein. For example, the computer system 600 illustrated in FIG. 6 and discussed in more detail below may be a suitable configuration of the computing system 200.

The computing system 200 may include a receiving device 202. The receiving device 202 may be configured to receive data over one or more networks via one or more network protocols. In some instances, the receiving device 202 may be configured to receive data from marketplaces 104, user devices 106, vendors 108, distributors 110, blockchain networks 112, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by marketplaces 104, vendors 108, or distributors 110 that may be superimposed or otherwise encoded with shipping information, which may include unique values, package identifiers, label photographs, public keys, or other data as discussed herein. The receiving device 202 may be configured to receive data signals electronically transmitted by user devices 106, which might be superimposed or otherwise encoded with shipping information (e.g., delivery address, requested unique values, etc.), requests for package authenticity, package identifiers, unique values, etc. The receiving device 202 may also be configured to receive data signals electronically transmitted by nodes in the blockchain network 112 that may be superimposed or otherwise encoded with blockchain data including blocks and/or blockchain data values included therein.

The computing system 200 may also include a communication module 204. The communication module 204 may be configured to transmit data between modules, engines, databases, memories, and other components of the computing system 200 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the computing system 200 and external components of the computing system 200, such as externally connected databases, display devices, input devices, etc. The computing system 200 may also include a processing device. The processing device may be configured to perform the functions of the computing system 200 discussed herein as will be apparent to persons having skill in the relevant art. In some embodiments, the processing device may include and/or be comprised of a plurality of engines and/or modules specially configured to perform one or more functions of the processing device, such as a querying module 218, validation module 220, determination module 222, generation module 224, etc. As used herein, the term "module" may be software or hardware particularly programmed to receive an input, perform one or more processes using the input, and provides an output. The input, output, and processes performed by various modules will be apparent to one skilled in the art based upon the present disclosure.

The computing system 200 may also include a memory 210. The memory 210 may be configured to store data for use by the computing system 200 in performing the functions discussed herein, such as public and private keys, symmetric keys, etc. The memory 210 may be configured to store data using suitable data formatting methods and schema and may be any suitable type of memory, such as read-only memory, random access memory, etc. The memory 210 may include, for example, encryption keys and algorithms, communication protocols and standards, data formatting standards and protocols, program code for modules and application programs of the processing device, and other data that may be suitable for use by the computing system 200 in the performance of the functions disclosed herein as will be apparent to persons having skill in the relevant art. In some embodiments, the memory 210 may be comprised of or may otherwise include a relational database that utilizes structured query language for the storage, identification, modifying, updating, accessing, etc. of structured data sets stored therein.

The memory 210 may be configured to store, for example, unique values or data used in the generation or identification thereof, package identifiers, cryptographic key pairs, public keys provided by vendors 108 or distributors 110, photograph data for machine-readable codes, application programs for the authentication of packages or the reading and decoding of machine-readable codes, etc. In some cases, the memory 210 may be configured to store blockchain data 212. The blockchain data 212 may be comprised of a copy of the complete blockchain associated with the blockchain network 112 or may include some of the blockchain data values included therein. For instance, in the user device 106, the blockchain data 212 may include only those blockchain data values requested by the user 102, such as for a specific package as identified via the associated package identifier.

The computing system 200 may also include or be otherwise interfaced with one or more input devices 214. The input devices 214 may be internal to the computing system 200 or external to the computing system 200 and connected thereto via one or more connections (e.g., wired or wireless) for the transmission of data to and/or from. The input devices 214 may be configured to receive input from a user of the computing system 200, such as the user 102, which may be provided to another module or engine of the computing system 200 (e.g., via the communication module 204) for processing accordingly. Input devices 214 may include any type of input device suitable for receiving input for the performing of the functions discussed herein, such as a keyboard, mouse, click wheel, scroll wheel, microphone, touch screen, track pad, camera, optical imager, etc. The input device 214 may be configured to, for example, read machine-readable codes displayed on labels affixed to a package, receive user input of unique values and/or package identifiers, etc.

The computing system 200 may also include or be otherwise interfaced with a display device 216. The display device 216 may be internal to the computing system 200 or external to the computing system 200 and connected thereto via one or more connections (e.g., wired or wireless) for the transmission of data to and/or from. The display device 216 may be configured to display data to a user of the computing system 200, such as the consumer 104. The display device 216 may be any type of display suitable for displaying data as part of the functions discussed herein, such as a liquid crystal display, light emitting diode display, thin film transistor display, capacitive touch display, cathode ray tube display, light projection display, etc. In some instances, the computing system 200 may include multiple display devices 216. The display device 216 may be configured to, for example, display authentication results as performed by the computing system 200 or received from a third party (e.g., via the receiving device 202).

The computing system 200 may include a querying module 218. The querying module 218 may be configured to execute queries on databases to identify information. The querying module 218 may receive one or more data values or query strings, and may execute a query string based thereon on an indicated database, such as the memory 210, to identify information stored therein. The querying module 218 may then output the identified information to an appropriate engine or module of the computing system 200 as necessary. The querying module 218 may, for example, execute a query on the memory 210 to identify a blockchain data value included in the blockchain data 212 that includes a package identifier as supplied to the computing system 200 for determining authenticity of a package.

The computing system 200 may also include a validation module 220. The validation module 220 may be configured to perform validations for the computing system 200 as part of the functions discussed herein. The validation module 220 may receive data to be validated as input, may perform the validation, and may output a result of the validation to another module or engine of the computing system 200. For example, the validation module 220 may be configured to validate digital signatures included in a blockchain data value or received from vendors 108 or distributors 110 using a public key.

The computing system 200 may also include a determination module 222. The determination module 222 may be configured to perform determinations for the computing system 200 as part of the functions discussed herein. The determination module 222 may receive instructions as input, may make determinations based on the instructions, and may output a result of the determination to another module or engine of the computing system 200. In some cases, the input may include data to be used in the determination. In other cases, the determination module 222 may be configured to identify such data as necessary to perform the requested determination. The determination module 222 may, for example, be configured to determine if a package is authentic, such as based on comparing unique values read from machine-readable codes displayed on the package to unique values included in a blockchain data value for the package (e.g., identified via the package identifier).

The computing system 200 may also include a generation module 224. The generation module 224 may be configured to generate data for use by the computing system 200 in performing the functions discussed herein. The generation module 224 may receive instructions as input, may generate data based on the instructions, and may output the generated data to one or more modules of the computing system 200. For example, the generation module 224 may be configured to generate cryptographic key pairs comprised of a private key and public key, and may be configured to generate digital signatures using the private key. The generation module 224 may also be configured to generate or otherwise identify unique values and/or package identifiers, and to generate machine-readable codes that are encoded with at least unique values.

The computing system 200 may also include a transmitting device 226. The transmitting device 226 may be configured to transmit data over one or more networks via one or more network protocols. In some instances, the transmitting device 226 may be configured to transmit data to marketplaces 104, user devices 106, vendors 108, distributors 110, blockchain networks 112, and other entities via one or more communication methods, local area networks, wireless area networks, cellular communication, Bluetooth, radio frequency, the Internet, etc. In some embodiments, the transmitting device 226 may be comprised of multiple devices, such as different transmitting devices for transmitting data over different networks, such as a first transmitting device for transmitting data over a local area network and a second transmitting device for transmitting data via the Internet. The transmitting device 226 may electronically transmit data signals that have data superimposed that may be parsed by a receiving computing device. In some instances, the transmitting device 226 may include one or more modules for superimposing, encoding, or otherwise formatting data into data signals suitable for transmission.

The transmitting device 226 may be configured to electronically transmit data signals to marketplaces 104 that may be superimposed or otherwise encoded with shipping information, such as a delivery address, requested unique values, and other data related to the purchase of a product. The transmitting device 226 may also be configured to electronically transmit data signals to vendors 108 that may be superimposed or otherwise encoded with product purchase information and shipping information to be used in the packaging and shipping of a product to the user 102. The transmitting device 226 may also be configured to electronically transmit data signals to nodes in the blockchain network 112, which may be superimposed or otherwise encoded with unique values, package identifiers, digital signatures, public keys, and/or any other data that may be used in the updating of the blockchain for a package being transported. The transmitting device 226 may also be configured to electronically transmit data signals to user devices 106 that may be superimposed or otherwise encoded with blockchain data, unique values, package identifiers, or other data as discussed herein.

Process for Secure Courier Transportation of a Package

Figure 3:
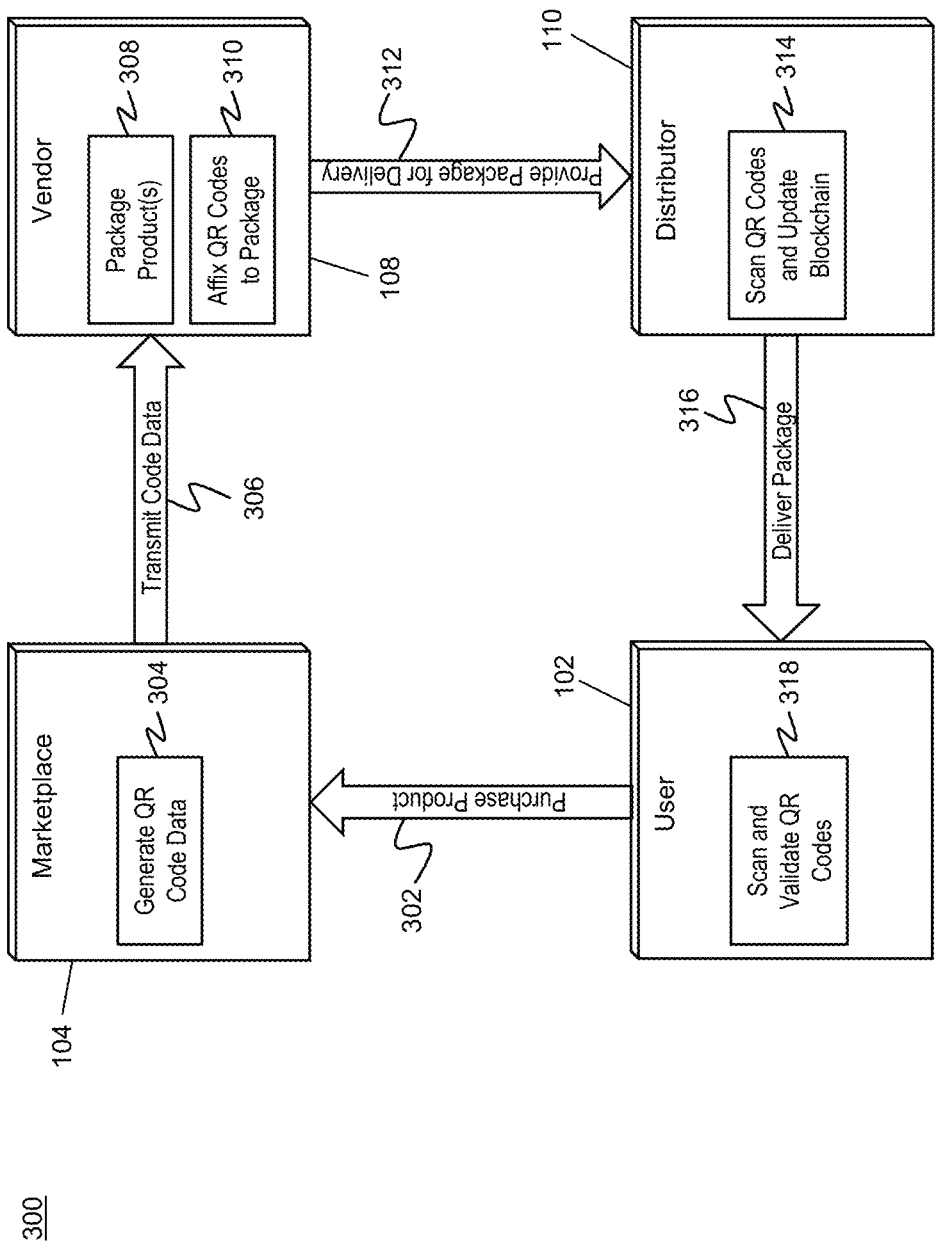
FIG. 3 is a flow diagram illustrating a process for the secure courier of a package using machine-readable codes and a blockchain using the system of FIG. 1 in accordance with exemplary embodiments.

FIG. 3 illustrates an example process 300 executed in the system 100 of FIG. 1 for the secure courier transportation of a package to a user 102 facilitated via the use of a blockchain.

In step 302, the user 102 may purchase a product from the marketplace 104. As part of the purchase of the product, the user 102 may supply the marketplace 104 with shipping information including at least a delivery address to where the product should be delivered for the user 102. In some cases, the user 102 may also supply one or more unique values to be included in the machine-readable codes generated for the product's shipping package. In step 304, the marketplace 104 may generate data to be encoded in the quick response (QR) codes that are to be affixed to the product's shipping package. The data may include at least the unique values, and may also include a package identifier or any other suitable data as discussed herein. In step 306, the marketplace 104 may transmit the unique values and any other data to the vendor 108 along with the delivery address and other shipping information of the user 102 as well as the information regarding the product that was purchase that is to be shipped to the user 102.

In step 308, the vendor may package the product that was purchase by the user 102. In step 310, the vendor 108 may generate and print a plurality of labels that are affixed to the package (e.g., at vulnerable points to prevent or otherwise highlight tampering), where each label has a QR code printed thereon that is encoded with a unique value. In cases where each QR code is also encoded with a package identifier, the package identifier may be generated by the vendor 108 or provided by the marketplace 104 (e.g., in step 306). In step 312, the vendor 108 may provide the package to the distributor 110 for delivery thereof to the user's specified delivery address. In some embodiments, the vendor 108 may first update the blockchain to include a new blockchain data value for the initial packaging of the product that includes the package identifier and each of the unique values.

In step 314, the distributor 110 may, using an input device 214, scan each of the QR codes on the package to obtain the unique values encoded thereon, as well as the package identifier, if applicable. The distributor 110 may then electronically transmit the unique values and package identifier to a node in the blockchain network 112. The node may update the blockchain by generating a new blockchain data value that includes the unique values and package identifier that is included in a new block that is validated and added to the blockchain. In some embodiments, the distributor 110 may be required to supply a digital signature that is validated by the node before the new blockchain data value is added to the blockchain. Throughout the delivery process, the distributor 110 may repeat step 314 and further include status updates in each of the updates that are provided to the blockchain network 112.

In step 316, the distributor 110 may deliver the package to the user's specified delivery address. In step 318, the user 102 may (e.g., via the user device 106 or through a third party system) scan each of the QR codes affixed to the delivered package to obtain the unique values encoded therein, as well as the package identifier, if applicable. The user device 106 or third party system may then identify the blockchain data values in the blockchain that are associated with the delivered package (e.g., identified via the package identifier) and compare the unique values read from the delivered package to those in the blockchain data values throughout the delivery process to ensure that the package is authentic and has not been tampered with or replaced. In some cases, the user 102 may perform step 318 throughout the delivery process using the unique values as may be provided by the marketplace during the purchase process in step 302, such as to check authenticity of the package while the distributor 110 couriers the package from the vendor 108 to the provided delivery address.

Exemplary Method for Preventing Tampering with a Package

Figure 4:
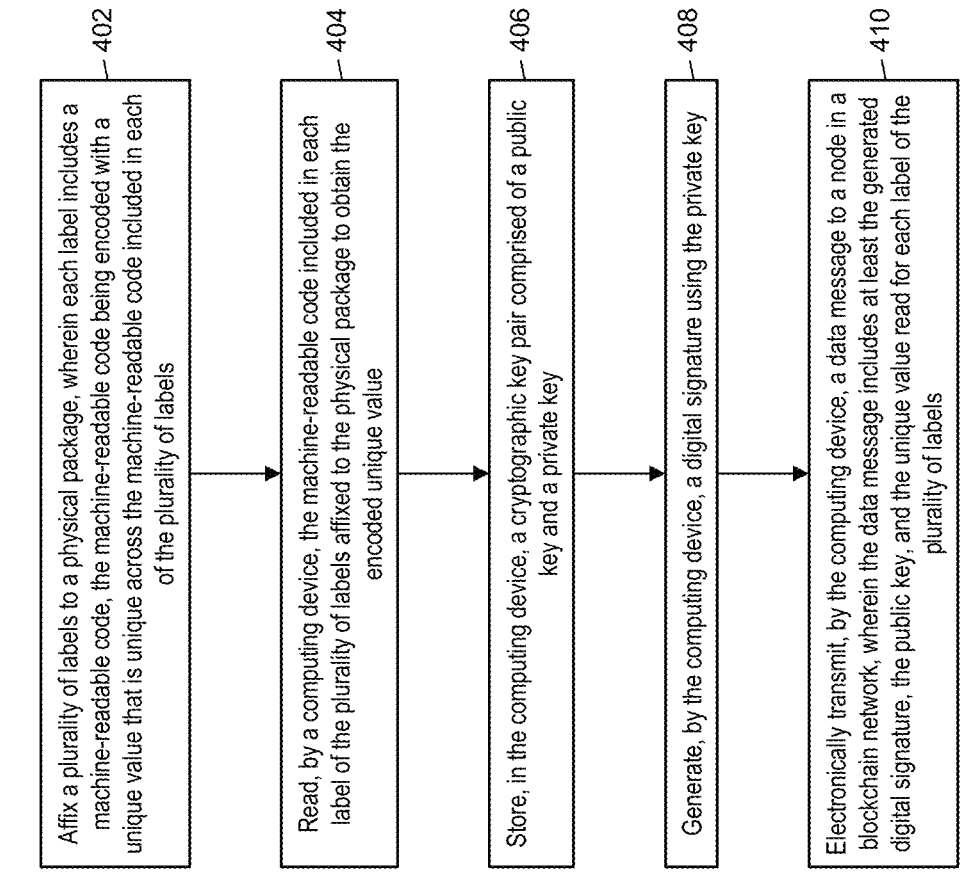
FIG. 4 is a flow chart illustrating an exemplary method for preventing tampering with a package in accordance with exemplary embodiments.

FIG. 4 illustrates a method 400 for the prevention of tampering with a package being delivered through machine-readable codes and a blockchain.

In step 402, a plurality of labels may be affixed to a physical package, wherein each label includes a machine-readable code, the machine-readable code being encoded with a unique value that is unique across the machine-readable code included in each of the plurality of labels. In step 404, the machine-readable code included in each label of the plurality of labels affixed to the physical package may be read (e.g., via an input device 214) by a computing device (e.g., the computing system 200) to obtain the encoded unique value. In step 406, a cryptographic key pair comprise of a public key and a private key may be stored in the computing device (e.g., in the memory 210).

In step 408, a digital signature may be generated by the computing device (e.g., by the generation module 224) using the private key. In step 410, a data message may be electronically transmitted by the computing device (e.g., via the transmitting device 226) to a node in a blockchain network (e.g., the blockchain network 112), wherein the data message includes at least the generated digital signature, the public key, and the unique value read for each label of the plurality of labels.

In one embodiment, each label may be affixed to a vulnerable point on the physical package. In some embodiments, the physical package may not be opened without damaging at least one machine-readable code included in one of the plurality of labels. In one embodiment, each machine-readable code may be further encoded with a common package identifier, and the data message may further include the common package identifier.

Exemplary Method for Determining Authenticity of a Package

Figure 5:
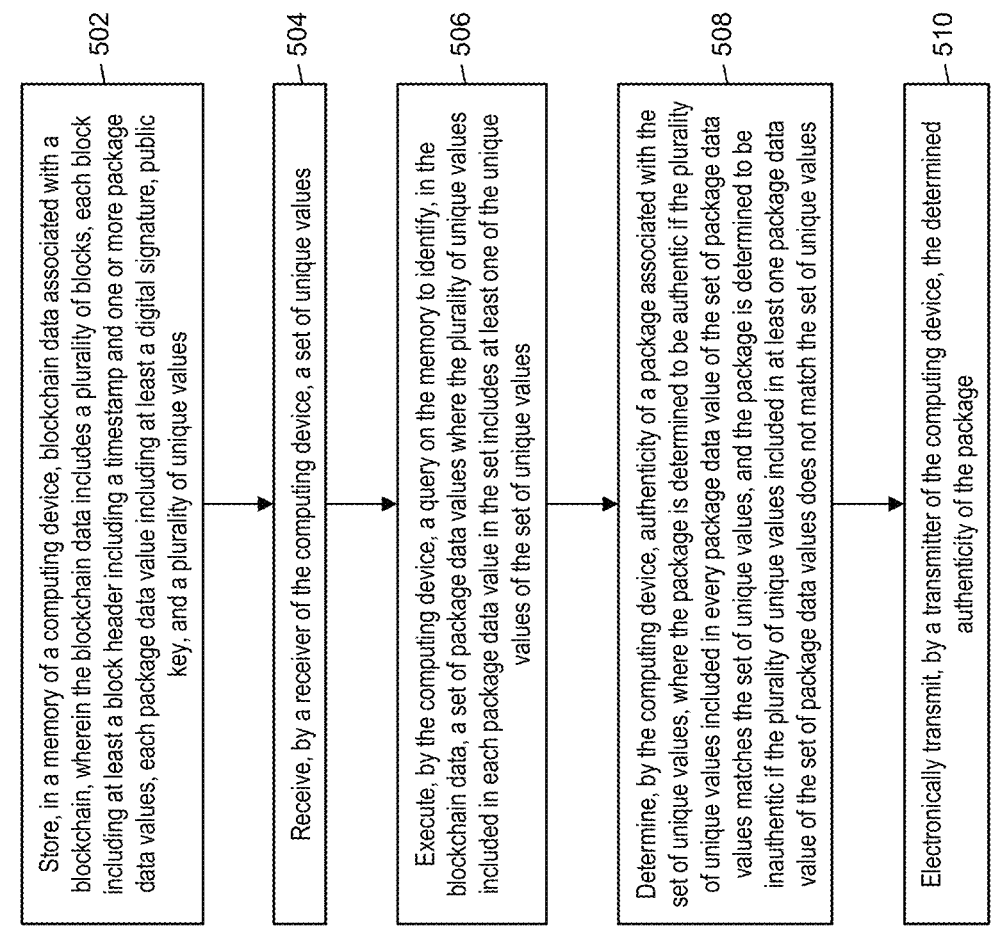
FIG. 5 is a flow chart illustrating an exemplary method for determining authenticity of a package in accordance with exemplary embodiments.

FIG. 5 illustrates a method 500 for determining the authenticity of a delivered package through the use of a series of machine-readable codes and a blockchain.

In step 502, blockchain data (e.g., blockchain data 212) associated with a blockchain may be stored in a memory (e.g., the memory 210) of a computing device (e.g., the computing system 200), wherein the blockchain data includes a plurality of blocks, each block including at least a block header including a timestamp and one or more package data values, each package data value including at least a digital signature, public key, and a plurality of unique values. In step 504, a set of unique values may be received by a receiver (e.g., the receiving device 202) of the computing device. In step 506, a query may be executed by the computing device (e.g., the querying module 218 thereof) on the memory to identify, in the blockchain data, a set of package data values where the plurality of unique values included in each package data value in the set includes at least one of the unique values of the set of unique values.

In step 508, authenticity of a package associated with the set of unique values may be determined by the computing device (e.g., the determination module 222 thereof), where the package is determined to be authentic if the plurality of unique values included in every package data value of the set of package data values matches the set of unique values, and the package is determined to be inauthentic if the plurality of unique values included in at least one package data value of the set of package data values does not match the set of unique values. In step 510, the determined authenticity of the package may be electronically transmitted by a transmitter (e.g., the transmitting device 226) of the computing device.

In one embodiment, the set of unique values may be received from an external device (e.g., the user device 106), and the determined authenticity of the package may be electronically transmitted to the external device. In some embodiments, if the package is determined to be inauthentic, the determined authenticity may be accompanied by at least the public key included in the at least one package data value. In one embodiment, the method 500 my further include validating, by the computing device (e.g., the validation module 220 thereof), the digital signature included in each package data value of the set of package data values using the included public key, wherein the package is determined to be inauthentic if the validation of the digital signature for at least one of the package data values of the set of package data values is unsuccessful.

Computer System Architecture

Figure 6:
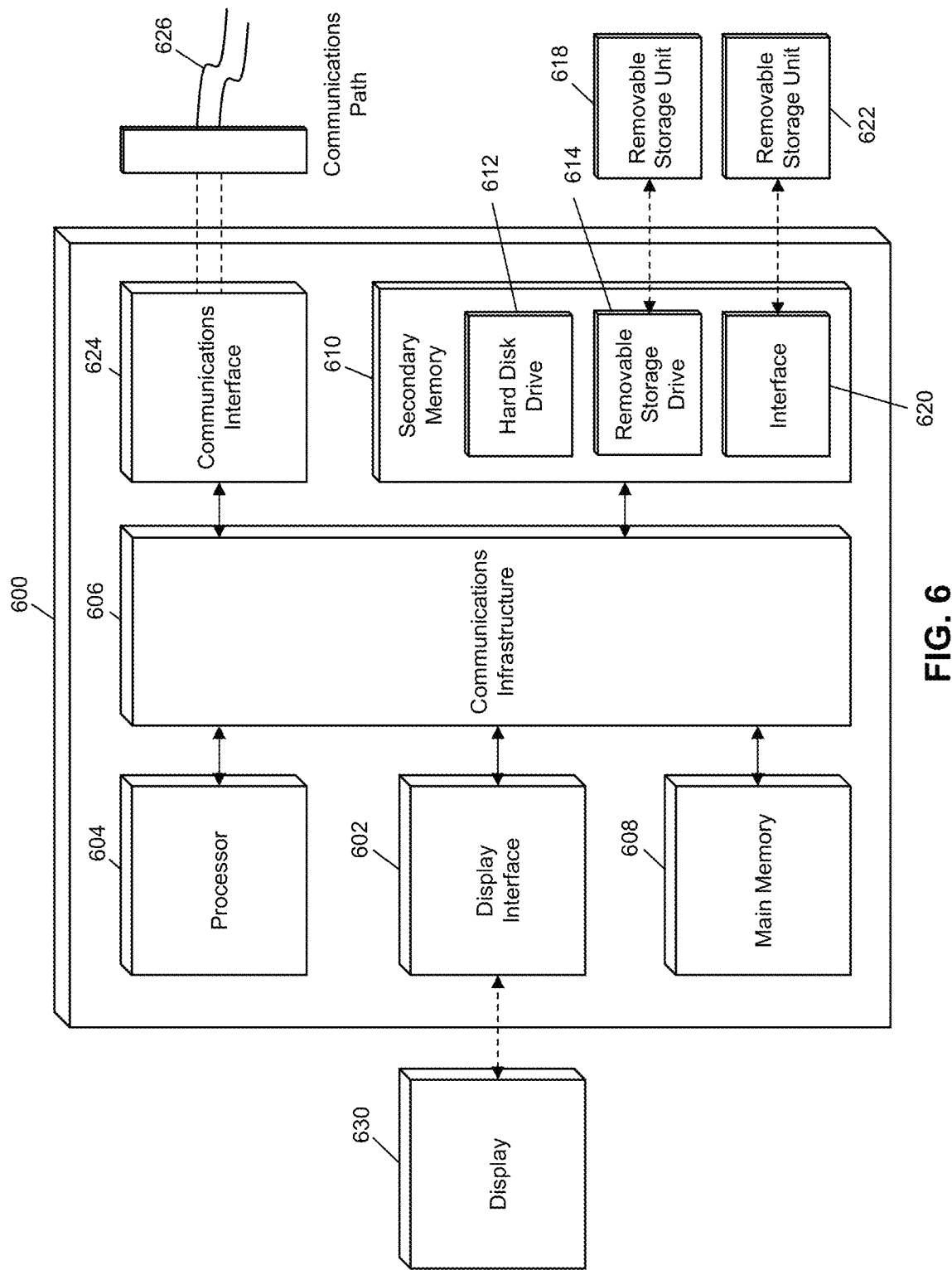
FIG. 6 is a block diagram illustrating a computer system architecture in accordance with exemplary embodiments.

FIG. 6 illustrates a computer system 600 in which embodiments of the present disclosure, or portions thereof, may be implemented as computer-readable code. For example, the processing server 102 of FIG. 1 may be implemented in the computer system 600 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3-5.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 618, a removable storage unit 622, and a hard disk installed in hard disk drive 612.

Various embodiments of the present disclosure are described in terms of this example computer system 600. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general purpose processor device specifically configured to perform the functions discussed herein. The processor device 604 may be connected to a communications infrastructure 606, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 600 may also include a main memory 608 (e.g., random access memory, read-only memory, etc.), and may also include a secondary memory 610. The secondary memory 610 may include the hard disk drive 612 and a removable storage drive 614, such as a floppy disk drive, a magnetic tape drive, an optical disk drive, a flash memory, etc.

The removable storage drive 614 may read from and/or write to the removable storage unit 618 in a well-known manner. The removable storage unit 618 may include a removable storage media that may be read by and written to by the removable storage drive 614. For example, if the removable storage drive 614 is a floppy disk drive or universal serial bus port, the removable storage unit 618 may be a floppy disk or portable flash drive, respectively. In one embodiment, the removable storage unit 618 may be non-transitory computer readable recording media.

In some embodiments, the secondary memory 610 may include alternative means for allowing computer programs or other instructions to be loaded into the computer system 600, for example, the removable storage unit 622 and an interface 620. Examples of such means may include a program cartridge and cartridge interface (e.g., as found in video game systems), a removable memory chip (e.g., EEPROM, PROM, etc.) and associated socket, and other removable storage units 622 and interfaces 620 as will be apparent to persons having skill in the relevant art.

Data stored in the computer system 600 (e.g., in the main memory 608 and/or the secondary memory 610) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 600 may also include a communications interface 624. The communications interface 624 may be configured to allow software and data to be transferred between the computer system 600 and external devices. Exemplary communications interfaces 624 may include a modem, a network interface (e.g., an Ethernet card), a communications port, a PCMCIA slot and card, etc. Software and data transferred via the communications interface 624 may be in the form of signals, which may be electronic, electromagnetic, optical, or other signals as will be apparent to persons having skill in the relevant art. The signals may travel via a communications path 626, which may be configured to carry the signals and may be implemented using wire, cable, fiber optics, a phone line, a cellular phone link, a radio frequency link, etc.

The computer system 600 may further include a display interface 602. The display interface 602 may be configured to allow data to be transferred between the computer system 600 and external display 630. Exemplary display interfaces 602 may include high-definition multimedia interface (HDMI), digital visual interface (DVI), video graphics array (VGA), etc. The display 630 may be any suitable type of display for displaying data transmitted via the display interface 602 of the computer system 600, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 608 and secondary memory 610, which may be memory semiconductors (e.g., DRAMs, etc.). These computer program products may be means for providing software to the computer system 600. Computer programs (e.g., computer control logic) may be stored in the main memory 608 and/or the secondary memory 610. Computer programs may also be received via the communications interface 624. Such computer programs, when executed, may enable computer system 600 to implement the present methods as discussed herein. In particular, the computer programs, when executed, may enable processor device 604 to implement the methods illustrated by FIGS. 3-5, as discussed herein. Accordingly, such computer programs may represent controllers of the computer system 600. Where the present disclosure is implemented using software, the software may be stored in a computer program product and loaded into the computer system 600 using the removable storage drive 614, interface 620, and hard disk drive 612, or communications interface 624.

The processor device 604 may comprise one or more modules or engines configured to perform the functions of the computer system 600. Each of the modules or engines may be implemented using hardware and, in some instances, may also utilize software, such as corresponding to program code and/or programs stored in the main memory 608 or secondary memory 610. In such instances, program code may be compiled by the processor device 604 (e.g., by a compiling module or engine) prior to execution by the hardware of the computer system 600. For example, the program code may be source code written in a programming language that is translated into a lower level language, such as assembly language or machine code, for execution by the processor device 604 and/or any additional hardware components of the computer system 600. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 600 to perform the functions disclosed herein. It will be apparent to persons having skill in the relevant art that such processes result in the computer system 600 being a specially configured computer system 600 uniquely programmed to perform the functions discussed above.

Techniques consistent with the present disclosure provide, among other features, systems and methods for preventing tampering with packages and determining authenticity thereof. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for determining authenticity of a package, comprising:
    storing, in a memory of a computing device, blockchain data associated with a blockchain, wherein the blockchain data includes a plurality of blocks, each block provides status information of a package, and includes at least a block header including a timestamp and one or more package data values, each package data value including at least a digital signature generated via a private key of a cryptographic key pair associated with a package's delivery status, a public key of the cryptographic key pair associated with the package's delivery status, and a plurality of unique values, each of the plurality of unique values corresponding to a value encoded in a machine-readable code affixed to the package, wherein at least one block in the blockchain includes a photograph of the machine-readable codes affixed to a package;
    receiving, by a receiver of the computing device during a delivery process, a set of unique values associated with a package in the delivery process, wherein each unique value in the set of unique values is read from a corresponding machine-readable code affixed to the package in the delivery process;
    executing, by the computing device, a query on the memory to identify, in the blockchain data, a set of package data values where the plurality of unique values included in each package data value in the set of package data values includes at least one of the unique values of the set of unique values read from a corresponding machine-readable code affixed to the package in the delivery process;
    determining, by the computing device at a selected point in the delivery process, authenticity of the package in the delivery process associated with the set of unique values;
    receiving, by the computing device, the digital signature included in each package data value of the set of package data values;
    validating, by the computing device, each digital signature using a copy of the stored public key;
    where:
        the package in the delivery process is determined to be authentic if the plurality of unique values included in every package data value of the set of package data values matches the set of unique values encoded in the plurality of machine-readable codes affixed to the package in the delivery process and the photograph of the machine-readable codes matches the codes affixed to the package in the delivery process at the selected point, and
        the package in the delivery process is determined to be inauthentic if the validation of the digital signature for at least one of the package data values of the set of package data values is unsuccessful; and
    electronically transmitting, by a transmitter of the computing device, the determined authenticity of the package in the delivery process.

2. The method of claim 1, wherein
    the set of unique values is received from an external device, and
    the determined authenticity of the package in the delivery process is electronically transmitted to the external device.

3. The method of claim 1, wherein if the package in the delivery process is determined to be authentic, the determined authenticity is accompanied by at least the public key included in the at least one package data value for validation of the digital signature included in each of the one or more package data values.

4. The method of claim 1, wherein the set of unique values is received from an entity in the delivery process.

5. The method of claim 4, wherein the entity is one of a vendor, a distributor, a delivery entity, a marketplace, and a user.

6. A system for determining authenticity of a package, comprising:
    a memory of a computing device configured to store blockchain data associated with a blockchain, wherein the blockchain data includes a plurality of blocks, each block provides status information of a package, and includes at least a block header including a timestamp and one or more package data values, each package data value including at least a digital signature generated via a private key of a cryptographic key pair associated with a package's delivery status, a public key of the cryptographic key pair associated with the package's delivery status, and a plurality of unique values, each of the plurality of unique values corresponding to a value encoded in a machine-readable code affixed to the package, wherein at least one block in the blockchain includes a photograph of the machine-readable codes affixed to a package;
    a receiver of the computing device configured to receive a set of unique values associated with a package in a delivery process, wherein each unique value in the set of unique values is read from a corresponding machine-readable code affixed to the package in the delivery process ; and
    a transmitter of the computing device, wherein:
    the computing device is configured to
        execute a query on the memory to identify, in the blockchain data, a set of package data values where the plurality of unique values included in each package data value in the set of package data values includes at least one of the unique values of the set of unique values read from a corresponding machine-readable code affixed to the package in the delivery process, determine, at a selected point in the delivery process, authenticity of the package in the delivery process associated with the set of unique values;

receive the digital signature included in each package data value of the set of package data values, and the computing device is further configured to validate the digital signature using a copy of the stored public key, where the package in the delivery process is determined to be authentic if the plurality of unique values included in every package data value of the set of package data values matches the set of unique values encoded in the plurality of machine-readable codes affixed to the package in the delivery process and the photograph of the machine-readable codes matches the codes affixed to the package in the delivery process at the selected point, and the package in the delivery process is determined to be inauthentic if the validation of the digital signature for at least one of the package data values of the set of package data values is unsuccessful, and the transmitter of the computing device is configured to electronically transmit the determined authenticity of the package in the delivery process.

7. The system of claim 6, wherein the set of unique values is received from an external device, and the determined authenticity of the package in the delivery process is electronically transmitted to the external device.

8. The system of claim 6, wherein, if the package in the delivery process is determined to be authentic, the determined authenticity is accompanied by at least the public key for validation of the digital signature included in each of the one or more package data values.

9. The system of claim 6, wherein the set of unique values is received from an entity in the delivery process.

10. The system of claim 9, wherein the entity is one of a vendor, a distributor, a delivery entity, a marketplace, and a user.

* * * * *